US 11,747,713 B2

(12) United States Patent
Okumura (10) Patent No.: US 11,747,713 B2
(45) Date of Patent: Sep. 5, 2023

(54) CAMERA DEVICE

(71) Applicant: YAMAHA CORPORATION, Hamamatsu (JP)

(72) Inventor: Keisuke Okumura, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/680,635

(22) Filed: Feb. 25, 2022

(65) Prior Publication Data

US 2022/0283478 A1 Sep. 8, 2022

(30) Foreign Application Priority Data

Mar. 2, 2021 (JP) ................................ 2021-032272

(51) Int. Cl.
G08B 13/196 (2006.01)
G03B 11/04 (2021.01)
G03B 7/26 (2021.01)
(52) U.S. Cl.
CPC .......... *G03B 11/043* (2013.01); *G03B 11/045* (2013.01); *G03B 7/26* (2013.01); *G08B 13/1963* (2013.01)
(58) Field of Classification Search
CPC ............................ G08B 13/1963; B60R 11/04
See application file for complete search history.

(56) References Cited

U.S. PATENT DOCUMENTS

| | | | |
|---|---|---|---|
| 4,833,534 A * | 5/1989 | Paff ........................ | H04N 7/183 348/E7.087 |
| 4,878,138 A | 10/1989 | Ando et al. | |
| 7,729,060 B2 * | 6/2010 | Shirakata ............... | G03B 17/12 359/701 |
| 9,628,683 B2 * | 4/2017 | Chu ....................... | H04N 7/183 |

(Continued)

FOREIGN PATENT DOCUMENTS

| | | |
|---|---|---|
| GB | 253142 A | 12/1927 |
| GB | 917875 A | 2/1963 |
| JP | 2010107772 A | 5/2010 |

OTHER PUBLICATIONS

International search report issued in Intl. Appln. No. PCT/IB2022/053934 dated Jul. 22, 2022.

(Continued)

*Primary Examiner* — Leon W Rhodes, Jr.
(74) *Attorney, Agent, or Firm* — ROSSI, KIMMS & McDOWELL LLP (57) ABSTRACT

A camera device includes: a base member; a camera which is rotatably attached to the base member about a first rotation axis; a shutter member which is rotatably attached to the base member about a second rotation axis, the second rotation axis being different from the first rotation axis and being parallel to the first rotation axis, the shutter member being rotatable between a cover position in which the shutter member covers the camera, and an open position in which the shutter member does not cover the camera; a power transmission member which is rotatably attached to the base (Continued)

member about a third rotation axis, the third rotation axis being different from the first rotation axis and being parallel to the first rotation axis; and a motor configured to rotationally drive the power transmission member.

9 Claims, 11 Drawing Sheets

(56) References Cited

U.S. PATENT DOCUMENTS

2015/0268534 A1    9/2015   Jikihara et al.
2020/0269772 A1*   8/2020   Schuetz .............. G03B 11/043

OTHER PUBLICATIONS

Written Opinion issued in Intl. Appln. No. PCT/IB2022/053934 dated Jul. 22, 2022.
Extended European search report issued in European Appln. No. 22158632.4 dated Aug. 2, 2022.

\* cited by examiner

CAMERA DEVICE

CROSS-REFERENCE TO RELATED APPLICATIONS

Priority is claimed on Japanese Patent Application No. 2021-032272, filed Mar. 2, 2021, the contents of which are incorporated herein by reference.

BACKGROUND OF THE INVENTION

Field of the Invention

The present invention relates to a camera device.

Description of Related Art

Japanese Unexamined Patent Application, First Publication No. 2010-107772 (hereinafter referred to as Patent Document 1) discloses a camera device (surveillance camera device) that changes the facing direction of a camera by using the driving force of a motor (actuator). The camera device of Patent Document 1 also includes a mechanism that moves the camera in an optical axis direction of the camera in conjunction with an operation that changes the facing direction of the camera. That is to say, the camera device of Patent Document 1 is configured to move a camera (a single object) in two directions (a direction that changes the facing direction of the camera, and the optical axis direction) at the same time.

When this type of camera device is used for web conferencing and the like, it is conceivable to provide a shutter that covers the camera to prevent unnecessary capture by the camera for the purpose of protecting privacy. Such a shutter may be provided so as to be movable between a position that covers the camera and a position that does not cover the camera. Although the shutter may be moved manually, for example, this is inconvenient if the camera device is installed in a place that is out of reach, or in a place that is hard to reach. Therefore, it is conceivable to move the shutter by using the driving force of a motor.

However, the camera and the shutter need to be moved independently of each other. Therefore, when production of a camera device with a shutter is attempted based on Patent Document 1, it is necessary to separately prepare the motor and drive mechanism for moving the camera and the motor and drive mechanism for moving the shutter. As a result, the number of components of the camera device increases, and the structure of the camera device becomes complicated. Furthermore, because the motor accounts for a large proportion of the cost of the camera device, there is also a problem that the cost of the camera device will increase with the addition of another motor.

SUMMARY OF THE INVENTION

The present invention has been made in view of the circumstances described above. An example object of the present invention is to provide a camera device which is capable of independently moving a camera and a shutter with the drive force of the same motor, while also reducing the number of components and simplifying the structure.

According to a first aspect of the present invention, a camera device includes: a base member; a camera which is rotatably attached to the base member about a first rotation axis; a shutter member which is rotatably attached to the base member about a second rotation axis, the second rotation axis being different from the first rotation axis and being parallel to the first rotation axis, the shutter member being capable of rotating between a cover position in which the shutter member covers the camera, and an open position in which the shutter member does not over the camera; a power transmission member which is rotatably attached to the base member about a third rotation axis, the third rotation axis being different from the first rotation axis and being parallel to the first rotation axis; and a motor configured to rotationally drive the power transmission member. The power transmission member causes the camera to rotate together with a rotation of the power transmission member in a first rotation angle range of the power transmission member. The power transmission member causes the shutter member to rotate together with a rotation of the power transmission member in a second rotation angle range of the power transmission member, the second rotation angle range being different from the first rotation angle range.

DETAILED DESCRIPTION OF THE INVENTION

Hereunder, embodiments of the present invention will be described with reference to FIGS. 1 to 12.

As shown in FIGS. 1 to 4, a camera device 1 includes a base member 2, a camera 3, a shutter member 4, a power transmission member 5, and a motor 6. The camera device 1 of the present embodiment further includes a reduction gear mechanism 7.

The base member 2 is configured so as to attach together the camera 3, the shutter member 4, the power transmission member 5, the motor 6, and the reduction gear mechanism 7. The base member 2 of the present embodiment is configured as a case that accommodates the camera 3, the power transmission member 5, the motor 6, and the reduction gear mechanism 7.

Figure 4:
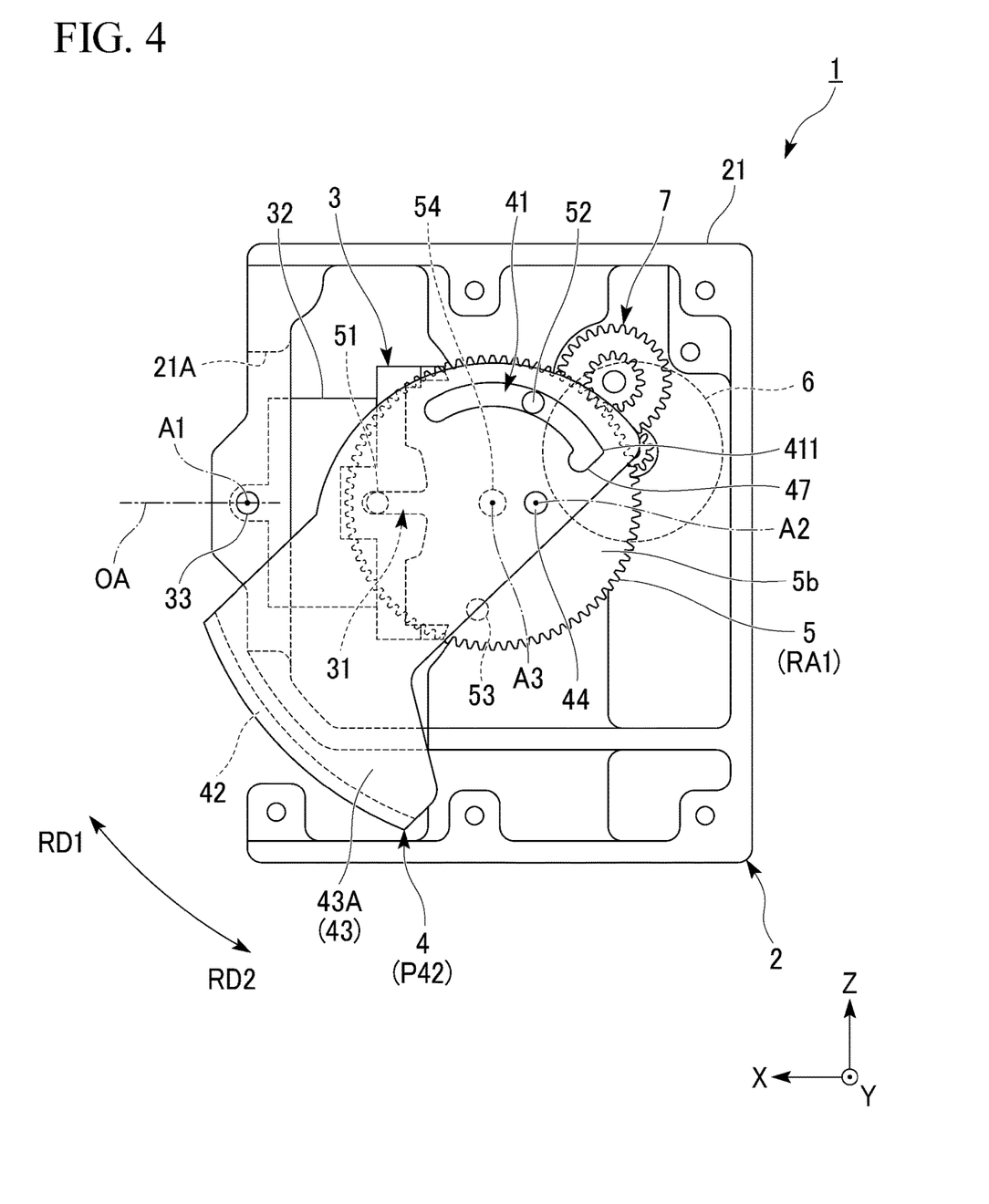
FIG. 4 is a diagram showing the positional relationship between the camera, the shutter member, and the power transmission member of the camera device of FIGS. 1 to 3, and illustrates a state in which the power transmission member is located in a first rotation angle range, the shutter member is disposed in an open position, and the camera is facing in a forward direction.

The base member 2 includes a base body 21 and a side wall portion 22. In FIG. 4, the side wall portion 22 is omitted. The camera 3, the power transmission member 5, the motor 6, and the reduction gear mechanism 7 are mainly attached to the base body 21. The base body 21 is formed with an opening portion (opening) 21A that allows the camera 3 accommodated inside the base body 21 to face the outside.

In the following description, the direction in which the opening portion 21A of the base body 21 faces (positive X-axis direction) may be referred to as the front, and the direction opposite to the front (negative X-axis direction) may be referred to as the rear. Furthermore, a first direction (Y-axis direction) orthogonal to the front-rear direction (X-axis direction) may be referred to as the width direction. Also, a second direction (Z-axis direction) orthogonal to the front-rear direction may be referred to as the up-down direction. Moreover, the positive Z-axis direction in the drawings may be referred to as up, and the negative Z-axis direction may be referred to as down.

The side wall portion 22 is attached to one side of the base body 21 in the width direction (positive Y-axis direction side), and covers the camera 3, a portion of the shutter member 4 (a portion of a first side plate portion 43A described below), the power transmission member 5, the motor 6, and the reduction gear mechanism 7 attached to the base body 21.

The camera 3 shown in FIGS. 1 to 5 captures images and videos. The camera 3 is rotatably attached to the base member 2 about a first rotation axis A1. Furthermore, the camera 3 has a first locking groove 31 formed so as to extend in the radial direction of the first rotation axis A1. Hereunder, the camera 3 of the present embodiment will be described in detail.

The camera 3 of the present embodiment has a cylindrical portion 32 whose interior is provided with a photography lens (not shown). The optical axis OA of the camera 3 coincides with the central axis of the cylindrical portion 32. The optical axis OA may, for example, be positioned with an offset with respect to the central axis of the cylindrical portion 32.

Figure 1:
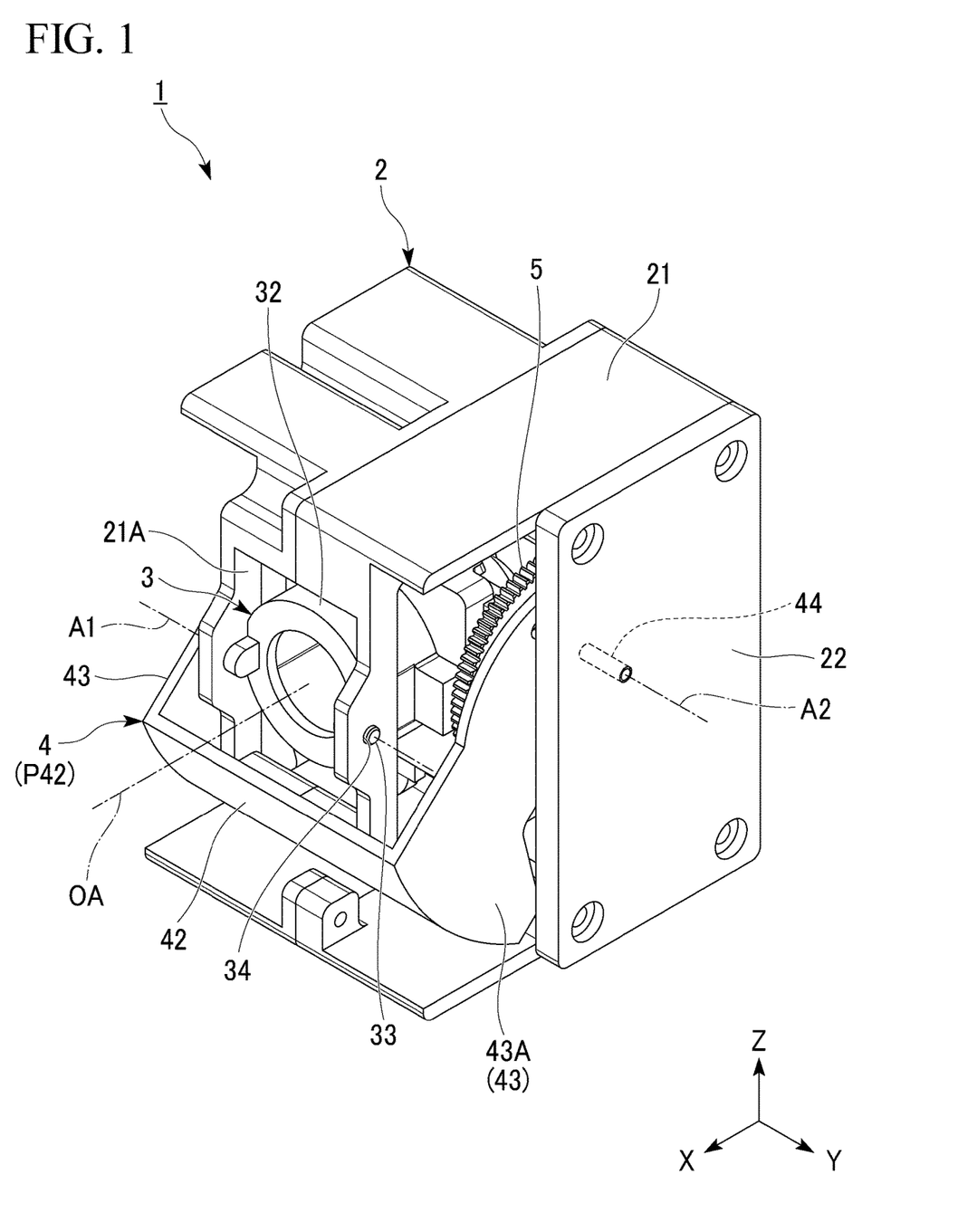
FIG. 1 is a perspective view of a camera device according to an embodiment of the present invention, and illustrates a state in which a shutter member is disposed in an open position.
Figure 5:
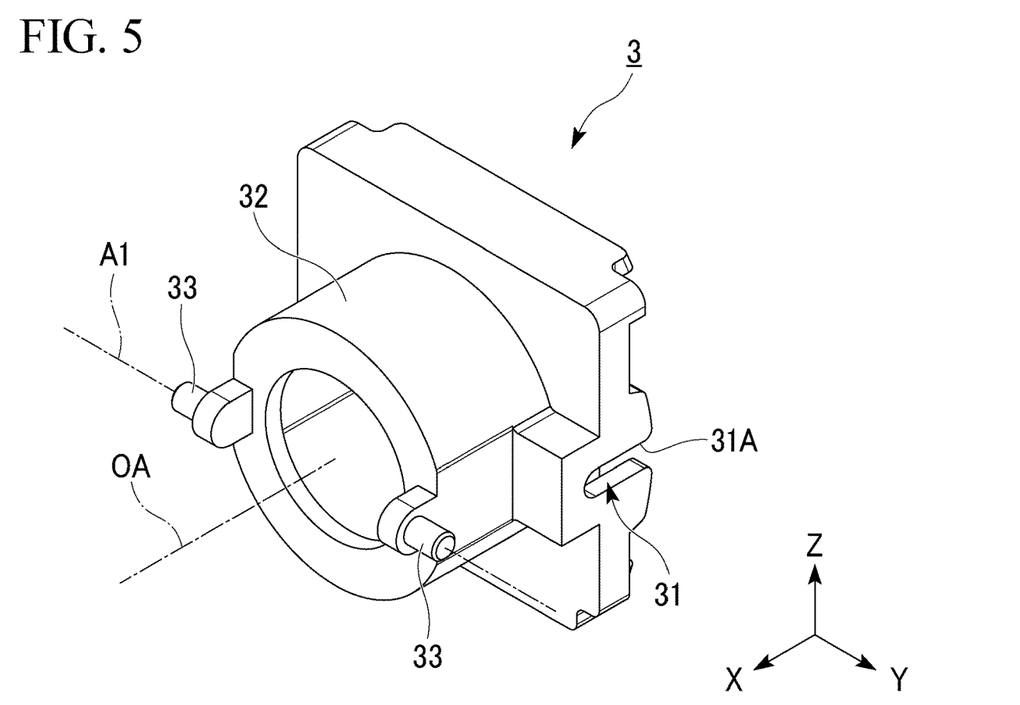
FIG. 5 is a perspective view showing the camera of the camera device of FIGS. 1 to 4.

The camera 3 is disposed at the position of the base member 2 where the opening portion 21A is formed. The camera 3 is rotatably attached to the base member 2 about the first rotation axis A1. The first rotation axis A1 extends in a direction orthogonal to the optical axis OA at a first end portion of the cylindrical portion 32 in the longitudinal direction. In the present embodiment, the first rotation axis A1 extends in the width direction (Y-axis direction). Consequently, as the camera 3 rotates with respect to the base member 2, the direction in which the optical axis OA of the camera 3 faces changes up and down (for example, see FIGS. 8 and 9). In the present embodiment, as shown in FIGS. 1 and 5, a shaft body 33 that constitutes the first rotation axis A1 is provided on the camera 3, and a hole 34 into which the shaft body 33 is inserted is formed in the base member 2. However, the embodiment of the present invention is not limited to such a configuration.

Figure 3:
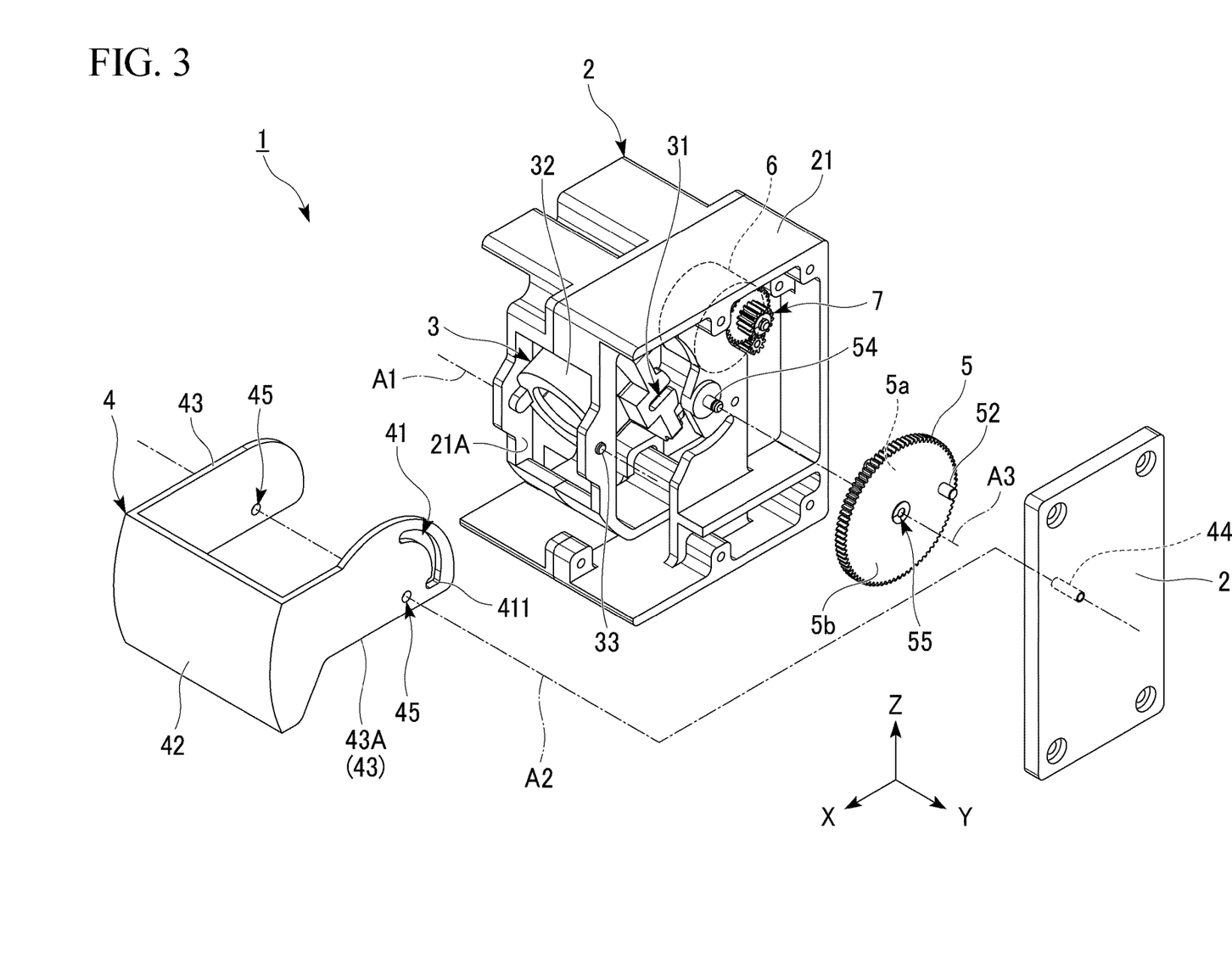
FIG. 3 is an exploded perspective view of the camera device of FIGS. 1 and 2.

As shown in FIGS. 3 and 4, the camera 3 is disposed such that the cylindrical portion 32 extends from the opening portion 21A of the base member 2 to the inside (rear) of the base member 2. As shown in FIGS. 3 to 5, the first locking groove 31 of the camera 3 is located in a second end portion of the cylindrical portion 32 in the longitudinal direction, which is located more to the inside (rear) than the opening portion 21A of the base member 2. Furthermore, the first locking groove 31 is located on one side of the cylindrical portion 32 in the width direction (positive Y-axis direction side). The first locking groove 31 extends linearly in the longitudinal direction of the cylindrical portion 32, and is open on the second end portion side of the cylindrical portion 32 in the longitudinal direction of the cylindrical portion 32.

Figure 2:
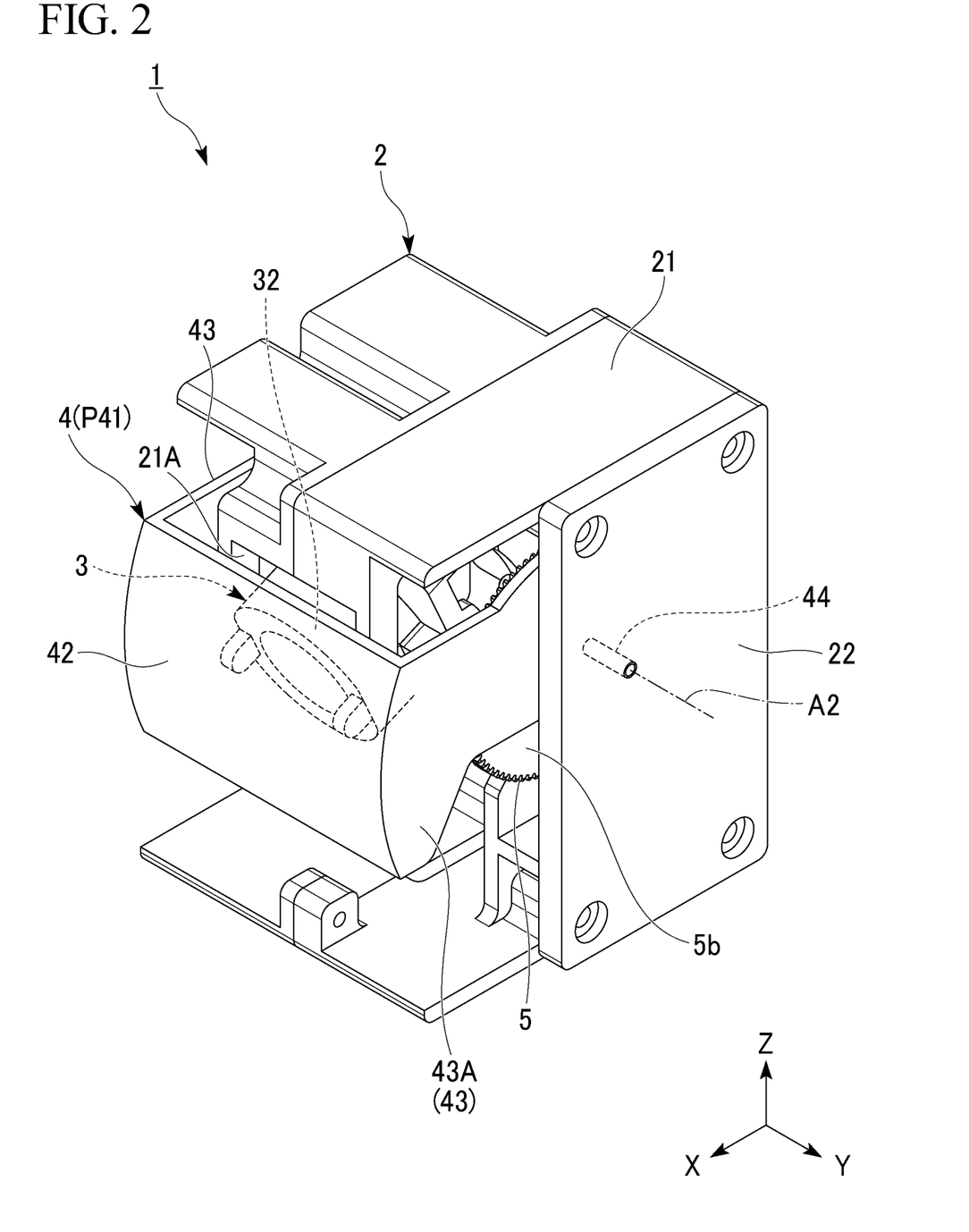
FIG. 2 is a perspective view of the camera device of FIG. 1, and illustrates a state in which the shutter member is disposed in a cover position.

The shutter member 4 shown in FIGS. 1 to 4 and FIG. 6 is a member for covering the camera 3, and is rotatably attached to the base member 2 about a second rotation axis A2 that is different from and is parallel to the first rotation axis A1. As a result of rotating about the second rotation axis A2, the shutter member 4 is capable of moving between a cover position P41, in which the camera 3 is covered as shown in FIG. 2, and an open position P42, in which the camera 3 is exposed to the outside as shown in FIGS. 1 and 4. As shown in FIGS. 3 and 4, the shutter member 4 includes a second locking groove 41 formed in an arc shape when viewed from the direction in which the second rotation axis A2 extends (width direction). Hereunder, the shutter member 4 of the present embodiment will be described in detail.

As shown in FIGS. 1 to 4 and FIG. 6, the shutter member 4 of the present embodiment includes a shutter body 42, and a pair of side plate portions 43.

The shutter body 42 is a part for covering the camera 3. The shutter body 42 is located away from the second rotation axis A2 in the radial direction, and has a curved plate shape so as to form an arc shape centered on the second rotation axis A2 when viewed from the width direction as shown in FIG. 4. The second rotation axis A2 is located away from, and more to the rear (negative X-axis direction) than the first rotation axis A1.

Figure 12:
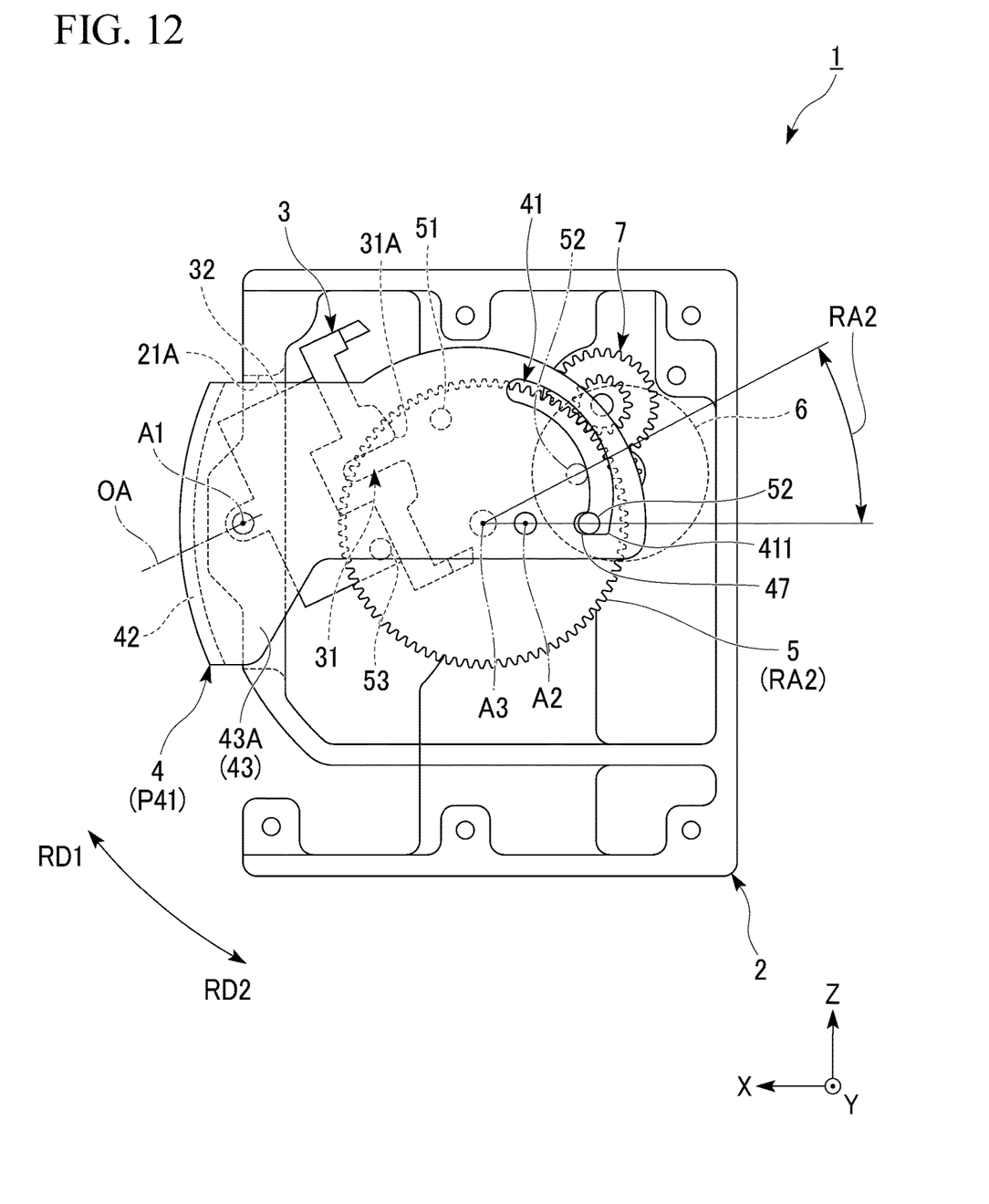
FIG. 12 is a diagram showing the positional relationship between the camera, the shutter member, and the power transmission member of the camera device of FIGS. 1 to 3, and illustrates a state in which the power transmission member is located in the second rotation angle range, and the shutter member is disposed in the cover position.

As shown in FIGS. 2 and 12, when the shutter member 4 is disposed in the cover position P41, the shutter body 42 is located in front of the opening portion 21A of the base member 2. As a result, the shutter body 42 covers the camera 3. On the other hand, as shown in FIGS. 1 and 4, when the shutter member 4 is disposed in the open position P42, the shutter body 42 is located below the opening portion 21A of the base member 2. As a result, the shutter body 42 does not cover the camera 3.

As shown in FIGS. 4 and 12, when the shutter body 42 is viewed from one side in the width direction (positive Y-axis direction side), the cover position P41 of the shutter body 42 is located so as to be away from the open position P42 in a clockwise direction (hereunder referred to as a first rotation direction RD1).

As shown in FIGS. 1 to 3 and FIG. 6, the pair of side plate portions 43 is formed with a plate shape extending in the radial direction of the second rotation axis A2 from both ends of the shutter body 42 in the width direction (Y-axis direction) toward the second rotation axis A2 side. The plate thickness direction of each side plate portion 43 is oriented in the width direction. The pair of side plate portions 43 is located with a spacing in the width direction. The pair of side plate portions 43 is located on both sides of the camera 3 in the width direction when the shutter member 4 is attached to the base member 2.

Figure 6:
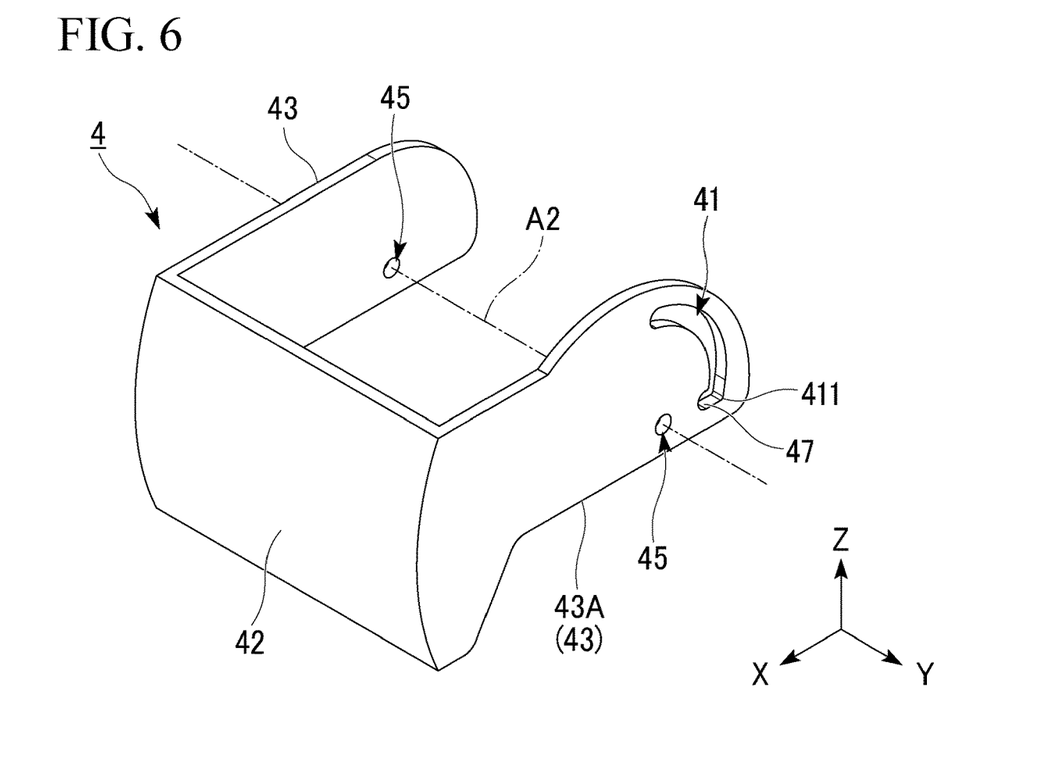
FIG. 6 is a perspective view showing the shutter member of the camera device of FIGS. 1 to 4.

As shown in FIGS. 3 and 6, holes 45 into which a shaft body 44 constituting the second rotation axis A2 is inserted are formed in the pair of side plate portions 43. The shaft body 44, which is provided on the side wall portion 22 of the base member 2, is inserted into the hole 45 of a first side plate portion 43A, which of the pair of side plate portions 43 is located on one side in the width direction (positive Y-axis direction side).

As shown in FIGS. 3 to 5, the second locking groove 41 of the shutter member 4 is formed in the first side plate portion 43A. The second locking groove 41 is formed with an arc shape centered on a third rotation axis A3 of the power transmission member 5 described below when the shutter member 4 is disposed in the open position P42. As shown in FIG. 4, when viewed from the one side in the width direction (positive Y-axis direction side), a first end portion 411 (end portion in the longitudinal direction of the second locking groove 41) is formed with an indentation 47. The first end portion 411 is located on the first rotation direction RD1 side of the second locking groove 41. The indentation 47 extends in a radially inward direction of the second locking groove 41 having an arc shape.

Figure 8:
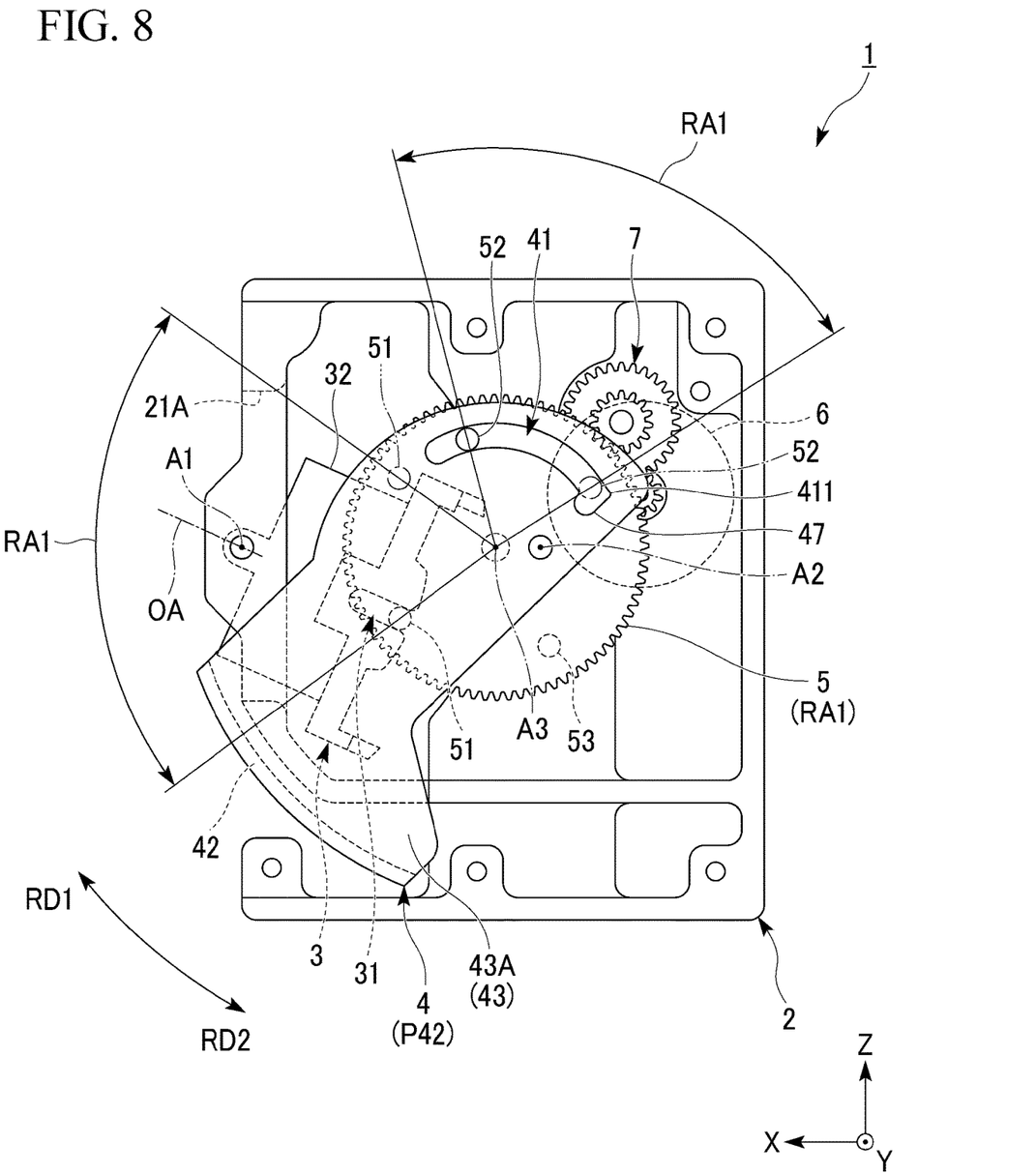
FIG. 8 is a diagram showing the positional relationship between the camera, the shutter member, and the power transmission member of the camera device of FIGS. 1 to 3, and illustrates a state in which the power transmission member is located in the first rotation angle range, the shutter member is disposed in the open position, and the camera is facing in a diagonally upward direction.
Figure 9:
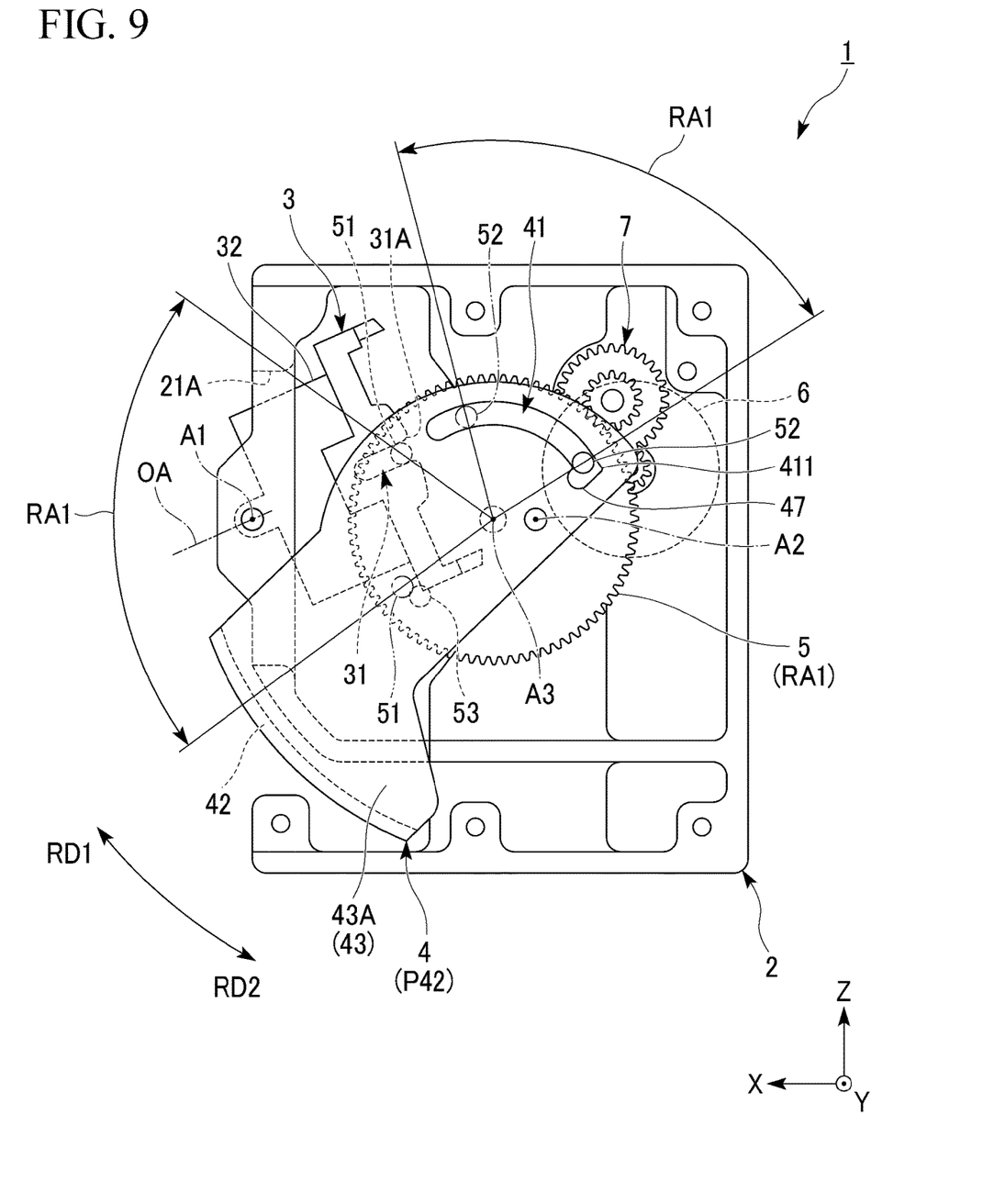
FIG. 9 is a diagram showing the positional relationship between the camera, the shutter member, and the power transmission member of the camera device of FIGS. 1 to 3, and illustrates a state in which the power transmission member is located in the first rotation angle range, the shutter member is disposed in the open position, and the camera is facing in a diagonally downward direction.
Figure 10:
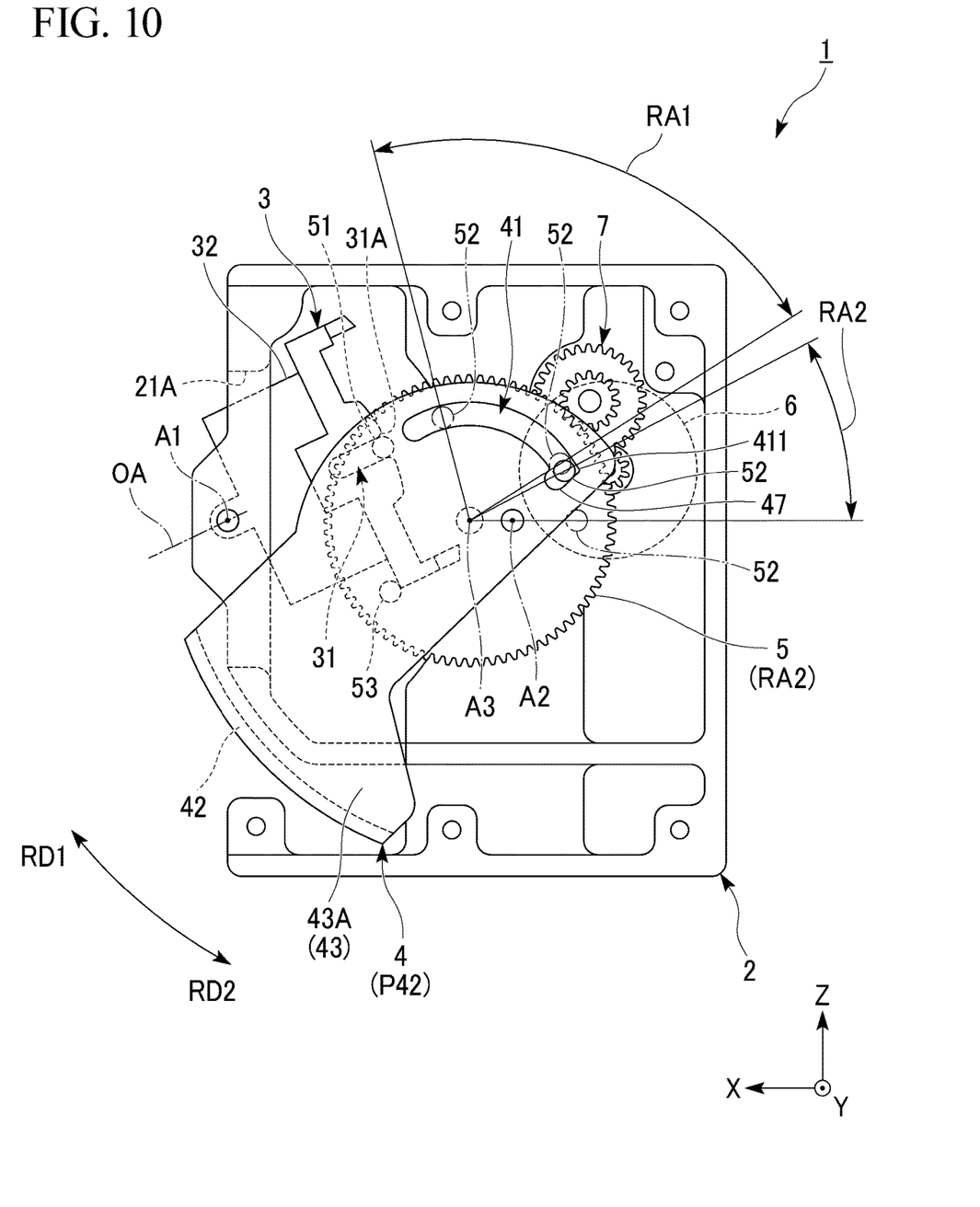
FIG. 10 is a diagram showing the positional relationship between the camera, the shutter member, and the power transmission member of the camera device of FIGS. 1 to 3, and illustrates a state in which the power transmission member is located in a second rotation angle range, the shutter member is disposed in the open position, and the camera is facing in a diagonally downward direction.
Figure 11:
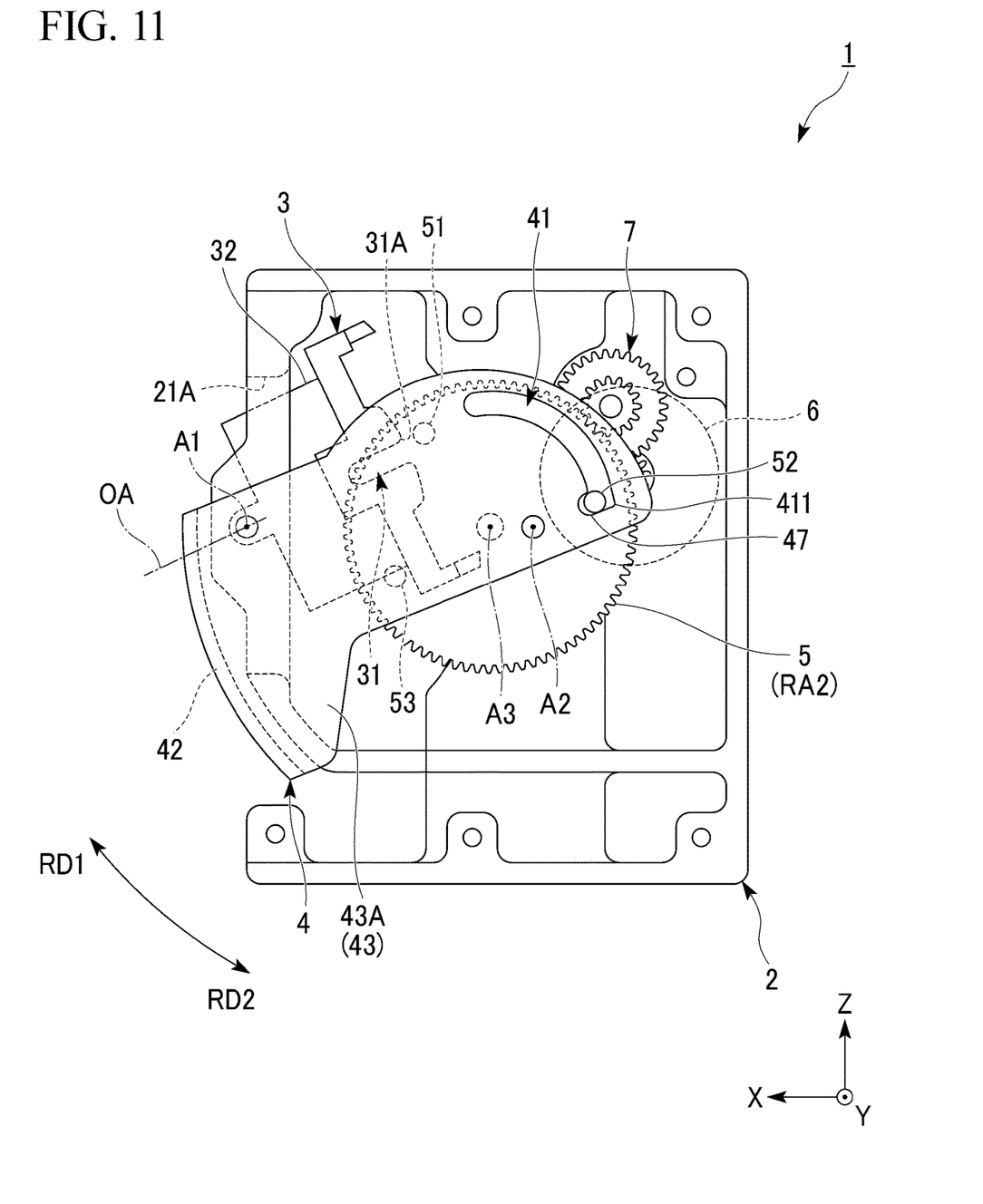
FIG. 11 is a diagram showing the positional relationship between the camera, the shutter member, and the power transmission member of the camera device of FIGS. 1 to 3, and illustrates a state in which the power transmission member is located in the second rotation angle range, and the shutter member is disposed between the open position and the cover position.

The power transmission member 5 shown in FIGS. 3 and 4 is rotatably attached to the base member 2 about the third rotation axis A3 that is different from and parallel to the first rotation axis A1. In the present embodiment, the third rotation axis A3 of the power transmission member 5 is located with an offset with respect to not only the first rotation axis A1, but also the second rotation axis A2. As shown in FIGS. 4, 8, and 9, the power transmission member 5 causes the camera 3 to rotate together with the rotation of the power transmission member 5 when located in a first rotation angle range RA1. Furthermore, as shown in FIGS. 10 to 12, the power transmission member 5 causes the shutter member 4 to rotate together with the rotation of the power transmission member 5 when located in a second rotation angle range RA2, which is different from the first rotation angle range RA1. Hereunder, the power transmission member 5 of the present embodiment will be described in detail.

Figure 7:
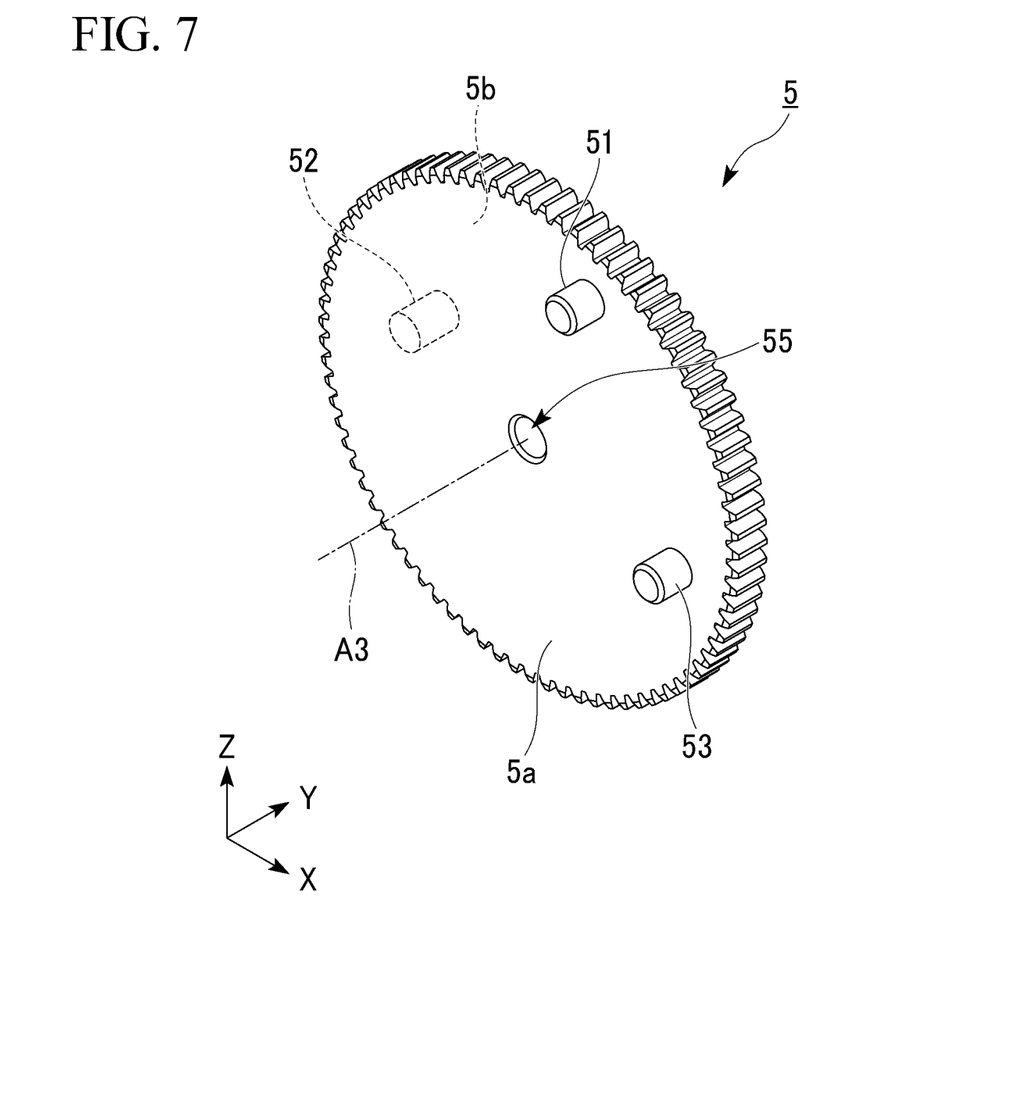
FIG. 7 is a perspective view showing the power transmission member of the camera device of FIGS. 1 to 4.

As shown in FIGS. 3 and 7, the power transmission member 5 of the present embodiment is a gear formed with a circular plate shape centered on the third rotation axis A3. A hole 55 into which a shaft body 54 constituting the third rotation axis A3 is inserted, is formed in the center of the power transmission member 5. In the present embodiment, the shaft body 54 constituting the third rotation axis A3 is provided on the base body 21.

The power transmission member 5 is disposed between the camera 3 and the first side plate portion 43A of the shutter member 4 in the width direction, with the plate thickness direction of the power transmission member 5 oriented in the width direction. As a result, the power transmission member 5 is located on the one side in the width direction (positive Y-axis direction side) with respect to the camera 3. In this state, the third rotation axis A3 of the power transmission member 5 is located between the first rotation axis A1 and the second rotation axis A2 in the front-rear direction. The third rotation axis A3 is located closer to the second rotation axis A2 than the first rotation axis A1 in the front-rear direction.

As shown in FIGS. 3, 4, and 7, the power transmission member 5 includes a first locking pin 51, a second locking pin 52, and a support pin 53. The first locking pin 51, the second locking pin 52, and the support pin 53 are each located away from the third rotation axis A3 in the radial direction. Moreover, the first locking pin 51, the second locking pin 52, and the support pin 53 are disposed with a spacing from each other in the circumferential direction of the third rotation axis A3.

The first locking pin 51 and the support pin 53 are provided on a first facing surface 5a, which is a surface of the power transmission member 5 facing the camera 3 in the width direction (Y-axis direction). On the other hand, the second locking pin 52 is provided on a second facing surface 5b, which is a surface of the power transmission member 5 facing the first side plate portion 43A of the shutter member 4 in the width direction (Y-axis direction).

As shown in FIGS. 4, 8, and 9, the first locking pin 51 is inserted into the first locking groove 31 of the camera 3 when the power transmission member 5 (the second locking pin 52 of the power transmission member 5) is located in the first rotation angle range RA1. In this state, the power transmission member 5 engages the camera 3, and the camera 3 rotates about the first rotation axis A1 together with the rotation of the power transmission member 5 about the third rotation axis A3. On the other hand, as shown in FIGS. 10 to 12, when the power transmission member 5 is located outside the first rotation angle range RA1, the first locking pin 51 of the power transmission member 5 becomes free from (moves out of) an open end 31A of the first locking groove 31 located on the second end portion side of the camera 3, and the engaged state between the power transmission member 5 and the camera 3 is released. In this state, even if the power transmission member 5 rotates, the camera 3 does not rotate.

That is to say, as shown in FIGS. 8 and 9, the first rotation angle range RA1 of the power transmission member 5 corresponds to a rotation angle range of the first locking pin 51 that results in a state where the first locking pin 51 is inserted into the first locking groove 31 of the camera 3 (that is to say, a state in which the power transmission member 5 engages with the camera 3).

Hereinafter, the mechanism by which the rotation of the power transmission member 5 and the rotation of the camera 3 (tilt mechanism of the camera 3) are linked will be further described.

In the present embodiment, the first rotation axis A1 and the third rotation axis A3 are located in line in the front-rear direction when viewed from the width direction as shown in FIGS. 4, 8, and 9. Furthermore, the first locking groove 31 of the camera 3 is located between the first rotation axis A1 and the third rotation axis A3 in the front-rear direction, and extends in the radial direction of the first rotation axis A1.

As shown in FIG. 4, when the first locking pin 51 inserted into the first locking groove 31 of the camera 3 is located between the first rotation axis A1 and the third rotation axis A3, the optical axis OA of the camera 3 faces the front (positive X-axis direction).

As shown in FIG. 8, when the power transmission member 5 is rotated in an anticlockwise direction about the third rotation axis A3 (hereunder referred to as a second rotation direction RD2) from the state shown in FIG. 4, the camera 3 rotates in the first rotation direction RD1 about the first rotation axis A1. As a result, the optical axis OA of the camera 3 faces diagonally upward.

On the other hand, as shown in FIG. 9, when the power transmission member 5 is rotated in the first rotation direction RD1 about the third rotation axis A3 from the state shown in FIG. 4, the camera 3 rotates in the second rotation direction RD2 about the first rotation axis A1. As a result, the optical axis OA of the camera 3 faces diagonally downward.

As shown in FIGS. 10 and 11, when the power transmission member 5 is rotated further in the first rotation direction RD1 from the state shown in FIG. 9, the first locking pin 51 of the power transmission member 5 becomes free from (moves out of) the open end 31A of the first locking groove 31 located on the second end portion side of the camera 3, and the engaged state between the power transmission member 5 and the camera 3 is released.

As shown in FIGS. 4 and 8 to 12, the second locking pin 52 is inserted into the second locking groove 41 formed in the first side plate portion 43A of the shutter member 4.

As shown in FIGS. 4, 8, and 9, when the power transmission member 5 (the second locking pin 52 of the power transmission member 5) is located in the first rotation angle range RA1, the shutter member 4 is disposed in the open position P42, and the second locking groove 41 of the shutter member 4 has an arc shape centered on the third rotation axis A3. Consequently, when the power transmission member 5 is located in the first rotation angle range RA1 (that is to say, is located outside the second rotation angle range RA2 described below), the second locking pin 52 is capable of moving in the longitudinal direction of the second locking groove 41 together with the rotation of the power transmission member 5. That is to say, when the power transmission member 5 is located in the first rotation angle range RA1, the engagement between the power transmission member 5 and the shutter member 4 is released, and the shutter member 4 does not rotate even if the power transmission member 5 rotates. FIGS. 8 and 9 show the rotation angle range of the second locking pin 52 that corresponds to the first rotation angle range RA1 of the power transmission member 5 (the rotation angle range of the first locking pin 51). The rotation angle range of the second locking pin 52 corresponding to the first rotation angle range RA1 is included in the movable range of the second locking pin 52 in the longitudinal direction of the second locking groove 41.

As shown in FIGS. 10 to 12, when the power transmission member 5 (the second locking pin 52 of the power transmission member 5) is located in the second rotation angle range RA2, which is different from the first rotation angle range RA1, the second locking pin 52 of the power transmission member 5 makes contact with the first end portion 411 (end portion) in the longitudinal direction of the second locking groove 41 of the shutter member 4. In this state, the power transmission member 5 engages with the shutter member 4, and the shutter member 4 rotates about the second rotation axis A2 together with the rotation of the power transmission member 5 about the third rotation axis A3. Furthermore, in this state, the first locking pin 51 is free from (moves out of) the first locking groove 31 of the camera 3.

The second rotation angle range RA2 of the power transmission member 5 corresponds to a rotation angle range of the second locking pin 52 that results in a state where the second locking pin 52 makes contact with the first end portion 411 of the second locking groove 41 of the shutter member 4. Furthermore, the second rotation angle range RA2 of the power transmission member 5 corresponds to a rotation angle range of the shutter member 4 from the open position P42 up to the cover position P41 of the shutter member 4.

As shown in FIG. 10, the first rotation angle range RA1 and the second rotation angle range RA2 of the power transmission member 5 are adjacently located in the circumferential direction of the power transmission member 5, which is centered on the third rotation axis A3. Specifically, the first rotation angle range RA1 and the second rotation angle range RA2 are arranged in order in the first rotation direction RD1. The first rotation angle range RA1 and the second rotation angle range RA2 may, for example, be arranged without a spacing. However, in the present embodiment, they are arranged with a spacing.

As a result, as shown in FIGS. 9 and 10, when the power transmission member 5 is rotated in the first rotation direction RD1 from the first rotation angle range RA1 toward the second rotation angle range RA2, the first locking pin 51 becomes free from (moves out of) the first locking groove 31. Then, when the power transmission member 5 further rotates in the first rotation direction RD1, the second locking pin 52 makes contact with the first end portion 411 of the second locking groove 41.

In contrast, when the power transmission member 5 is rotated in the second rotation direction RD2 from the second rotation angle range RA2 toward the first rotation angle range RA1, the second locking pin 52 separates from the first end portion 411 of the second locking groove 41. Then, when the power transmission member 5 further rotates in the second rotation direction RD2, the first locking pin 51 is inserted into the first locking groove 31.

Hereinafter, the mechanism by which the rotation of the power transmission member 5 and the rotation of the shutter member 4 are linked will be further described.

As shown in FIG. 10, when the shutter member 4 is disposed in the open position P42, and the power transmission member 5 rotates inside the second rotation angle range RA2 in the first rotation direction RD1, the second locking pin 52, which is in contact with the first end portion 411 of the second locking groove 41, pushes and rotates the shutter member 4 in the first rotation direction RD1. As a result, as shown in FIGS. 10 to 12, the shutter member 4 moves from the open position P42 toward the cover position P41.

Here, as described above, the second locking groove 41 has an arc shape centered on the third rotation axis A3 when the shutter member 4 is disposed in the open position 42. Furthermore, the second rotation axis A2 of the shutter member 4 and the third rotation axis A3 of the power transmission member 5 are located such that they are offset from each other. Consequently, the shutter member 4 rotationally moves from the open position P42 to the cover position P41 in conjunction with the rotation of the power transmission member 5 in the first rotation direction RD1. As a result, the second locking pin 52 in contact with the first end portion 411 of the second locking groove 41 moves in the radially inward direction with respect to the second locking groove 41, and is inserted into the indentation 47 formed in the first end portion 411 of the second locking groove 41.

On the other hand, as shown in FIG. 12, when the shutter member 4 is disposed in the cover position P41, and the power transmission member 5 rotates inside the second rotation angle range RA2 in the second rotation direction RD2, the second locking pin 52 inserted into the indentation 47 of the first end portion 411 of the second locking groove 41 pushes and rotates the shutter member 4 in the second rotation direction RD2. As a result, as shown in FIGS. 10 to 12, the shutter member 4 moves from the cover position P41 toward the open position P42.

As shown in FIG. 10, when the shutter member 4 reaches the open position P42, the second locking pin 52 becomes free from (moves out of) the indentation 47 in the first end portion 411 of the second locking groove 41. As a result, even when the power transmission member 5 is further rotated in the second rotation direction RD2, the second locking pin 52 does not push the shutter member 4 in the second rotation direction RD2. That is to say, the shutter member 4 does not further rotate in the second rotation direction RD2 from the open position P42.

As shown in FIGS. 10 to 12, the support pin 53 supports the camera 3 so as to suppress a rotation of the camera 3 about the first rotation axis A1 when the power transmission member 5 located in the second rotation angle range RA2. Furthermore, as shown in FIGS. 4, 8, and 9, the support pin 53 is located away from the camera 3 so as to not interfere with the rotation of the camera 3 when the power transmission member 5 is located in the first rotation angle range RA1.

Hereinafter, the specific mode by which the camera 3 is supported by the support pin 53 will be described.

As shown in FIGS. 10 to 12, when the power transmission member 5 is located in the second rotation angle range RA2 and rotates in the first rotation direction RD1, and moves the shutter member 4 from the open position P42 to the cover position P41, the support pin 53 located below the camera 3 upwardly moves so as to approach the cylindrical portion 32 of the camera 3. As a result, the support pin 53 supports from below the part of the cylindrical portion 32 of the camera 3 located more to the inside (rear) of the base member 2 than the first rotation axis A1. In this state, the support pin 53 keeps the optical axis OA of the camera 3 facing diagonally downward. That is to say, the orientation of the camera 3 can be maintained within a predetermined range when the first locking pin 51 of the power transmission member 5 is free from (moves out of) the first locking groove 31 of the camera 3.

The motor 6 rotationally drives the power transmission member 5 described above. The motor 6 may, for example, directly drive the third rotation axis A3 of the power transmission member 5. In the present embodiment, the motor 6 rotationally drives the power transmission member 5 via the reduction gear mechanism 7. The reduction gear mechanism 7 transmits the drive force of the motor 6 to the power transmission member 5 such that the rotation speed of the power transmission member 5 is lower than the rotation speed of the motor 6.

As described above, in the camera device 1 of the present embodiment, when the power transmission member 5 rotates inside the first rotation angle range RA1, the camera 3 rotates in conjunction with the rotation of the power transmission member 5, and the shutter member 4 does not rotate. On the other hand, when the power transmission member 5 rotates inside the second rotation angle range RA2, the shutter member 4 rotates in conjunction with the rotation of the power transmission member 5, and the camera 3 does not rotate.

As a result, when the power transmission member 5 rotates, the camera 3 and the shutter member 4 do not move at the same time. That is to say, the camera 3 and the shutter member 4 can be moved independently by the same motor 6 and power transmission member 5. Therefore, it is possible to independently move the camera 3 and the shutter member 4, while also reducing in the number of components of the camera device 1 and simplifying the structure of the camera device 1. Furthermore, because the camera device 3 and the shutter member 4 can be independently moved using the same motor 6, a reduction in the cost of the camera device 1 can be achieved by reducing the number of motors 6 and simplifying the structure of the camera device 1 compared with a conventional device.

Moreover, as shown in FIGS. 10 to 12, in the camera device 1 of the present embodiment, when the power transmission member 5 rotates inside the second rotation angle range RA2 in the second rotation direction RD2 so as to approach the first rotation angle range RA1, the shutter member 4 moves from the cover position P41 toward the open position P42. Therefore, when the power transmission member 5 rotates in the second rotation direction RD2 and shifts from the second rotation angle range RA2 to the first rotation angle range RA1, the shutter member 4 is disposed in the open position P42. As a result, when the power transmission member 5 rotates inside the first rotation angle range RA1, the orientation of the camera 3 can be changed by rotating the camera 3 together with the rotation of the power transmission member 5 while the shutter member 4 is disposed in the open position P42 (a state where the shutter member 4 is not covering the camera 3). That is to say, the direction (region) captured by the camera 3 can be changed.

Furthermore, in the camera device 1 of the present embodiment, because the power transmission member 5 engages with the camera 3 in the first rotation angle range RA1, the camera 3 rotates together with the rotation of the power transmission member 5. On the other hand, when the power transmission member 5 is located outside the first rotation angle range RA1, the engagement between the camera 3 and the power transmission member 5 is released, and thus the camera 3 does not rotate together with the rotation of the power transmission member 5. Moreover, because the power transmission member 5 engages with the shutter member 4 in the second rotation angle range RA2, the shutter member 4 rotates together with the rotation of the power transmission member 5. On the other hand, when the power transmission member 5 is located outside the second rotation angle range RA2, the engagement between the shutter member 4 and the power transmission member 5 is released, and the shutter member 4 does not rotate together with the rotation of the power transmission member 5.

Further, in the camera device 1 of the present embodiment, the power transmission member 5 and the camera device 3 are engaged as a result of the first locking pin 51 of the power transmission member 5 being inserted into the first locking groove 31 of the camera device 3. In addition, the power transmission member 5 and the shutter member 4 are engaged as a result of the second locking pin 52 of the power transmission member 5 making contact with the first end portion 411 of the second locking groove 41 of the shutter member 4.

With such a specific structure, the camera 3 and the shutter member 4 can be moved separately, and not simultaneously, by the same motor 6 with certainty.

Furthermore, in the camera device 1 of the present embodiment, the power transmission member 5 has the support pin 53 that supports the camera 3 so as to suppress a rotation of the camera 3 about the first rotation axis A1 when located in the second rotation angle range RA2. Consequently, as a result of the power transmission member 5 rotationally moving from the first rotation angle range RA1 to the second rotation angle range RA2, the position (posture) of the camera 3 is maintained by the support pin 53 even when the first locking pin 51 of the power transmission member 5 is free from (moves out of) the first locking groove 31 of the camera 3. As a result, when the power transmission member 5 rotationally moves from the second rotation angle range RA2 to the first rotation angle range RA1, the first locking pin 51 of the power transmission member 5 can be inserted into the first locking groove 31 of the camera 3 with certainty.

The embodiments of present invention have been described in detail above. However, the present invention is not limited to the embodiments above, and various changes may be applied within a scope not departing from the spirit of the present invention.

In the camera device of the present invention, for example, the second rotation axis A2 of the shutter member 4 and the third rotation axis A3 of the power transmission member 5 may coincide with each other.

According to an embodiment of the present invention, it is possible to independently move a camera and a shutter with the drive force of the same motor, while also reducing the number of components of the camera device and simplifying the structure.

The present invention has been described in detail above. However, the present invention is not limited to the embodiments above, and various modifications may be made to the above configurations without departing from the scope of the invention

What is claimed is:

1. A camera device comprising:
   a base member;
   a camera which is rotatably attached to the base member about a first rotation axis, the camera including a first locking groove that extends in a radial direction of the first rotation axis;
   a shutter member which is rotatably attached to the base member about a second rotation axis, the second rotation axis being different from the first rotation axis and being parallel to the first rotation axis, the shutter member being rotatable between a cover position in which the shutter member covers the camera, and an open position in which the shutter member does not cover the camera;
   a power transmission member which is rotatably attached to the base member about a third rotation axis, the third rotation axis being different from the first rotation axis and being parallel to the first rotation axis, the power transmission member including a first locking pin and a second locking pin that are located at positions separated from the third rotation axis in a radial direction of the third rotation axis, the first locking pin and the second locking pin being spaced apart from each other in a circumferential direction of the third rotation axis; and
   a motor configured to rotationally drive the power transmission member;
   wherein the first locking pin is inserted in the first locking groove when the rotation of the power transmission member is within the first rotation angle range, and the first locking pin is not inserted in the first locking groove when the rotation of the power transmission member is within the second rotation angle range, thereby causing the camera to rotate together with a rotation of the power transmission member in a first rotation angle range of the power transmission member, and
   wherein the power transmission member causes the shutter member to rotate together with a rotation of the power transmission member in a second rotation angle range of the power transmission member, the second rotation angle range being different from the first rotation angle range.

2. The camera device according to claim 1,
   wherein the first rotation angle range and the second rotation angle range of the power transmission member are adjacently positioned in a circumferential direction of the rotation of the power transmission member,
   wherein the shutter member moves from the open position toward the cover position when the rotation of the power transmission member is within the second rotation angle range in a first rotation direction, the first rotation direction being a direction from the first rotation angle range toward the second rotation angle range, and
   wherein the shutter member moves from the cover position toward the open position when the rotation of the power transmission member is within the second rotation angle range in a second rotation direction, the second rotation direction being an opposite direction to the first rotation direction.

3. The camera device according to claim 1, wherein the camera rotates together with the rotation of the power transmission member by the power transmission member engaging with the camera when the power transmission member is rotating in the first rotation angle range.

4. The camera device according to claim 1, wherein the shutter member rotates together with the rotation of the power transmission member by the power transmission member engaging with the shutter member when the power transmission member is rotating in the second rotation angle range.

5. The camera device according to claim 1, wherein the power transmission member includes a support pin that supports the camera so as to suppress a rotation of the camera about the first rotation axis when the rotation of the power transmission member is within the second rotation angle range.

6. A camera device comprising:
   a base member;
   a camera which is rotatably attached to the base member about a first rotation axis;
   a shutter member which is rotatably attached to the base member about a second rotation axis, the second rotation axis being different from the first rotation axis and being parallel to the first rotation axis, the shutter member being rotatable between a cover position in which the shutter member covers the camera, and an open position in which the shutter member does not cover the camera;
   a power transmission member which is rotatably attached to the base member about a third rotation axis, the third rotation axis being different from the first rotation axis and being parallel to the first rotation axis, the power transmission member including a first locking pin and a second locking pin that are located at positions separated from the third rotation axis in a radial direction of the third rotation axis, the first locking pin and the second locking pin being spaced apart from each other in a circumferential direction of the third rotation axis; and a motor configured to rotationally drive the power transmission member, wherein the shutter member has an arc shape centered on the third rotation axis, and includes a second locking groove into which the second locking pin is inserted when the shutter member is located in the open position, wherein the second locking pin is movable in a longitudinal direction of the second locking groove when the rotation of the power transmission member is within the first rotation angle range, and the second locking pin contacts an end portion of the second locking groove in the longitudinal direction when the rotation of the power transmission member is within the second rotation angle range, wherein the power transmission member causes the camera to rotate together with a rotation of the power transmission member in a first rotation angle range of the power transmission member, and wherein the shutter member rotates together with the rotation of the power transmission member by the second locking pin contacting the end portion of the second locking groove, in a second rotation angle range of the power transmission member, the second rotation angle range being different from the first rotation angle range.

7. The camera device according to claim 6, wherein the first rotation angle range and the second rotation angle range of the power transmission member are adjacently positioned in a circumferential direction of the rotation of the power transmission member, wherein the shutter member moves from the open position toward the cover position when the rotation of the power transmission member is within the second rotation angle range in a first rotation direction, the first rotation direction being a direction from the first rotation angle range toward the second rotation angle range, and wherein the shutter member moves from the cover position toward the open position when the rotation of the power transmission member is within the second rotation angle range in a second rotation direction, the second rotation direction being an opposite direction to the first rotation direction.

8. The camera device according to claim 6, wherein the camera rotates together with the rotation of the power transmission member by the power transmission member engaging with the camera when the power transmission member is rotating in the first rotation angle range.

9. The camera device according to claim 6, wherein the shutter member rotates together with the rotation of the power transmission member by the power transmission member engaging with the shutter member when the power transmission member is rotating in the second rotation angle range.

* * * * *